United States Patent Office 3,087,909
Patented Apr. 30, 1963

3,087,909
AMINOSILICON-ALKYLSILICATE COPOLYMERS
Edward Lewis Morehouse, Snyder, and Robert John Lisanke, Buffalo, N.Y., assignors to Union Carbide Corporation, New York, N.Y.
No Drawing. Filed Dec. 23, 1958, Ser. No. 782,981
11 Claims. (Cl. 260—46.5)

This invention relates to organosilicon compounds and processes for the production thereof.

This invention provides copolymers which contain (1) at least one group that is represented by the formula:

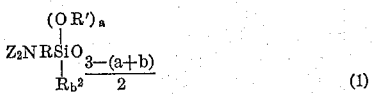
(1)

wherein Z is a hydrogen atom, a monovalent hydrocarbon group, or an amino-substituted monovalent hydrocarbon group, R is a divalent hydrocarbon group containing at least three carbon atoms, the $Z_2N-$ group is attached to at least the third carbon removed from the silicon atom, R′ is an alkyl group, $R^2$ is a monovalent hydrocarbon group, $a$ has a value from 0 to 2, $b$ has a value from 0 to 2, and $(a+b)$ has a value from 0 to 2; and (2) at least one group that is represented by the formula:

(2)

where $R^3$ is an alkyl group, preferably an alkyl group containing from 1 to 4 carbon atoms such as a methyl, ethyl, propyl or butyl group, and $c$ has a value from 1 to 3. Preferably, the copolymers contain at least one group represented by Formula 1 where $a$ is 1 or 2.

Illustrative of the monovalent hydrocarbon groups represented by Z and $R^2$ in Formula 1 are the alkyl groups such as the methyl, ethyl and propyl groups, the aryl groups such as the phenyl group and the aralkyl groups such as the beta-phenylethyl group. Preferably these monovalent hydrocarbon groups contain from 1 to 10 carbon atoms. In Formula 1, R is a divalent hydrocarbon group containing at least three carbon atoms such as an arylene group (e.g. a meta- or a para-phenylene group), a group containing an arylene group linked to an alkylene group (e.g. a —$C_6H_4CH_2CH_2$— group), a group containing an alkylene group linked to an arylene group (e.g. a —$C_6H_4CH_2$— group) or an alkylene group (e.g. a 1,3 propylene group). Illustrative of the amino-substituted monovalent hydrocarbon groups represented by Z in Formula 1 are the beta-aminoethyl and the gamma-aminopropyl groups. Preferably these amino-substituted monovalent hydrocarbon groups contain from 2 to 10 carbon atoms. In Formula 1, R′ is an alkyl group such as a methyl, ethyl or propyl group.

Preferably, the copolymers of this invention contain those groups represented by Formula 1 that are more specifically depicted by the formula:

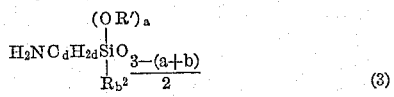
(3)

wherein $d$ has a value of at least 3 and preferably from 3 to 5, the $C_dH_{2d}$ group contains at least three carbon atoms, the $H_2N$ group is attached to at least the third carbon removed from the silicon atom, and R′, $R^2$, $a$ and $b$ have the above-defined meanings. Illustrative groups represented by Formula 3 are the gamma-aminopropylsiloxy, gamma-aminopropyl(methyl)siloxy, gamma-aminopropyl(dimethyl)siloxy, delta-aminobutylsiloxy, delta-aminobutyl(methyl)siloxy, and delta-aminobutyl(dimethyl)siloxy groups.

In addition to groups represented by Formulae 1 and 2, the copolymers of this invention can contain groups represented by the formula:

(4)

wherein $R^4$ is a monovalent hydrocarbon group, such as an alkyl group (e.g. a methyl, ethyl or propyl group), an aryl group (e.g. a phenyl group), an aralkyl group (e.g. a beta-phenylethyl group), an alkenyl group (e.g. a vinyl or allyl group), a cycloalkenyl group (e.g. a cyclohexenyl group) or a cycloalkyl group (e.g. a cyclohexyl group) and $c$ has a value from 1 to 3. Preferably the groups represented by $R^4$ contain up to ten carbon atoms. Illustrative of groups represented by Formula 4 are the methylsiloxy, dimethylsiloxy, trimethylsiloxy, beta-phenylethyl(dimethyl)siloxy, diphenylsiloxy, diethylsiloxy, phenyl(ethyl)siloxy, ethyl(vinyl)siloxy, and methyl(vinyl)siloxy groups.

Illustrative of the copolymers of this invention is a copolymer containing groups represented by the formulae:

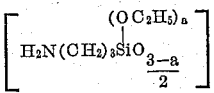

and

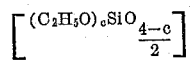

wherein $a$ has a value from 0 to 2 and $c$ has a value from 1 to 3; a copolymer containing groups represented by the formulae:

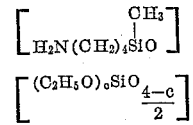

and

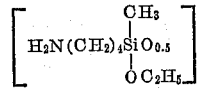

wherein $c$ has a value from 1 to 3; a copolymer represented by the formula:

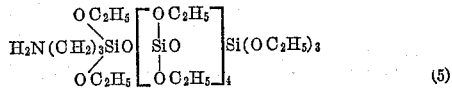
(5)

a copolymer represented by the formula:

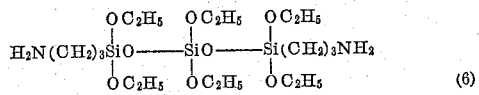
(6)

and a copolymer represented by the formula:

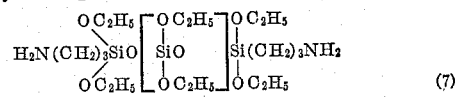
(7)

The copolymers of this invention can contain $SiO_2$ groups and silicon-bonded hydroxyl groups.

The copolymers of this invention can contain from 0.1 to 99.9 parts by weight of groups represented by Formula 1 and from 0.1 to 99.9 parts by weight of groups represented by Formula 2 per 100 parts by weight of the copolymer. However, it is preferable that the copolymer contain from 5 parts to 75 parts by weight of groups represented by Formula 1 and from 25 to 95 parts by weight of groups represented by Formula 2 per 100 parts by weight of the copolymer.

The copolymers of this invention are produced by a process that involves forming a mixture of a siloxane containing a group represented by Formula 1 and an alkylsilicate and heating the mixture to a temperature sufficiently elevated to cause the siloxane and the alkyl silicate to react to produce the copolymer. Preferably, this process is conducted employing a basic compound as a catalyst.

The siloxanes used as reactants in the process of this invention contain a group represented by Formula 1 and preferably contain groups represented by Formula 3. These siloxanes include completely condensed compounds such as gamma-aminopropylpolysiloxanes, delta-aminobutylpolysiloxanes, gamma-aminopropyl(methyl) cyclic trimer and tetramer, delta-aminobutyl(methyl) siloxane cyclic trimer and tetramer, alkoxy endblocked gamma-aminopropylmethylsiloxanes, and delta-aminobutylmethylsiloxanes. These completely condensed siloxanes reactants can also contain groups represented by Formula 4.

Also included among these useful siloxane reactants are incompletely condensed (i.e. hydroxyl-containing) siloxanes formed by hydrolyzing and uncompletely condensing silanes represented by the formula:

(8)

wherein Z, R, $R^2$, c and b have the above-defined meanings and X is an alkoxy (i.e. OR') group (e.g. methoxy, ethoxy or propoxy group). Illustrative of silanes represented by Formula 8 are gamma-aminopropyltriethoxysilane, gamma-aminopropyl(methyl)diethoxysilane, gamma-aminopropyl(dimethyl)ethoxysilane, delta-aminobutyltriethoxysilane, delta-aminobutyl(dimethyl)ethoxysilane.

Useful incompletely condensed copolymeric siloxane reactants can also be produced by hydrolyzing and incompletely condensing silane mixtures containing both silanes represented by Formula 8 and silanes represented by the formula:

$$R_c^3SiX_{4-c}$$ (9)

wherein $R^3$, X and c have the above-defined means. Illustrative of silanes represented by Formula 9 are methyltriethoxysilane, dimethyldiethoxysilane, trimethylethoxysilane, beta-phenylethyldimethylethoxysilane, diphenyldiethoxysilane, diethyldiethoxysilane, phenylethyldiethoxysilane, ethylvinyldiethoxysilane, and methylvinyldiethoxysilane. Incompletely condensed siloxane reactants are preferably produced by hydrolyzing and partially condensing silanes (along with, if desired, silanes represented by Formula 9) represented by the formula:

(10)

wherein $R^2$, X, b, c and d have the above-defined meanings.

Completely condensed siloxane reactants can be produced by hydrolyzing and completely condensing silanes represented by Formula 8, or preferably silanes represented by Equation 10, along with, if desired, silanes represented by Formula 9.

Hydolysis of silanes represented by Formula 8 and mixtures of silanes represented by Formulae 8 and 9 can be conducted by slowly adding to the silanes the stoichiometric amount of water required to hydrolyze at least one of the groups represented by X while stirring the mixture. The hydrolyzate so produced spontaneously condense to some extent even at room temperature. Heating produces a more completely condensed siloxane.

Siloxanes containing groups represented by Formula 1 and silanes represented by Formulae 8 and 10 and processes of the production are disclosed in United States patent applications Serial Nos. 615,480, filed October 12, 1956; 655,506, filed April 29, 1957; and 615,463, filed October 12, 1956. Organosilicon compounds containing the $NH_2CH_2C_6H_4Si\equiv$ group can be produced by reducing compounds containing the $NCC_6H_4Si\equiv$ group. By way of illustration, p-aminomethylphenyltriethoxysilane can be produced by forming a mixture of p-cyanophenyltriethoxysilane dissolved in toluene, hydrogen and a catalytic amount of nickel supported on alumina and heating the mixture to a temperature of about 150° C. to cause the p-cyanophenyltriethoxysilane and the hydrogen to react to produce para-aminomethylphenyltriethoxysilane.

The alkylsilicates used as reactants in the process of this invention are compounds composed of at least one silicon atom, at least one silicon-bonded alkoxy group and, when there is more than one silicon atom in the compound, oxygen atoms linking the silicon atoms. Included among these alkoxysilicate reactants are monomeric compound represented by the formula:

$$Si(OR^3)_4$$ (11)

wherein $R^3$ has the above-defined meaning and polymeric compounds containing at least two groups represented by Formula 2. Illustrative of these monomeric alkoxysilicate reactants are methyl orthosilicate, ethyl orthosilicate, and propyl orthosilicate. Illustrative of these polymeric alkoxysilicate reactants are the compounds represented by the formulae:

$$C_2H_5O[Si(OC_2H_5)_2O]_5C_2H_5$$ (12)

$$[C_2H_5OSiO_{1.5}]_x$$ (13)

wherein x is an integer; and $$(C_2H_5O)_3SiOSi(OC_2H_5)_3$$ (14)

It is usually preferable to employ a basic compound as a catalyst in producing the copolymers of this invention. Useful catalysts are the alkali metal hydroxides and silanolates and quaternary ammonium hydroxides. Illustrative of these catalysts are cesium, sodium, and potassium hydroxide, sodium and potassium dimethylsilanolates, and tetramethyl ammonium hydroxide. The preferred catalysts are potassium and cesium hydroxides and silanolates. The amount of the catalyst used is not narrowly critical and so may vary from 10 parts to 100 parts by weight of the catalyst per million parts by weight of the reactants. Perferably, from 20 parts to 100 parts by weight of the catalyst per million parts by weight of the reactants are employed. When trifunctional siloxane reactants are used [e.g., compounds containing the group $H_2N(CH_2)_3SiO_{1.5}$], amounts of catalysts at the higher end of the indicated ranges are used since such siloxanes were found to poison the catalyst to some extent.

The temperature employed in producing the compounds of this invention can vary depending on whether or not a catalyst is used and, when a catalyst is used, depending on the particular type catalyst employed. Thus, the temperature employed can vary from 80° C. to 250° C. When no catalyst is used, the reactants are caused to react by heating them from 170° C. to 250° C. When an alkali metal hydroxide is used as a catalyst, temperatures from 150° C. to 170° C. are preferred. When quaternary ammonium hydroxides are used as catalysts, temperatures from 80° C. to 120° C. are preferred. Deviations from these temperatures are not advisable. The reactants are usually maintained at the indicated temperatures from 4 to 24 hours to cause them to react. In order to prevent undesirable side reactions of the reactants and the copolymer with atmospheric oxygen, the reactants can be heated in an atmosphere of an inert gas such as argon, nitrogen, and the like.

The reaction of the siloxanes and alkylsilicates used as starting materials in this invention can be illustrated by the reactions of gamma-aminopropyl(methyl)siloxane cyclic tetramer and tetraethyl orthosilicate and hexaethoxydisiloxane:

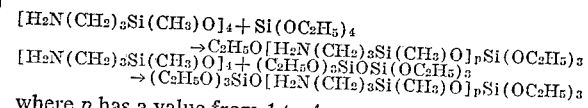

where p has a value from 1 to 4.

The copolymers of this invention are useful as polishes for materials such as painted steel surfaces (e.g. file cabinets, etc.). Polishes containing these copolymers dry rapidly to produce hard and glossy films.

The following examples illustrate the present invention:

*Example I*

A mixture was formed in a 200-cc. flask. The mixture contained 66.1 g. of an ethoxy endblocked aminopropylpolysiloxane that was an oil and that contained an average of 0.6 ethoxy group per silicon atom and 34.8 g. (0.167) of tetraethyl orthosilicate. Two layers persisted even when the flask was swirled. The mixture was heated to 150° C. and became homogeneous, but two phases formed when the mixture was cooled to 5° C. The mixture again became homogeneous when heated to 28° C. The physical properties of this homogeneous, unreacted mixture were: molecular weight (cryoscopic), 609; viscosity, 54 centipoises; and index of refraction ($n_D^{25}$), 1.4410. The homogeneous, unreacted mixture was heated on an oil bath at 155° C., and a potassium dimethylsilanolate catalyst (containing 100 parts by weight of potassium per million parts by weight of the reactants) was added. The heating at 155° C. was continued for 16 hours. The reactants partially reacted during this period to produce an oil having the following physical properties: molecular weight (cryoscopic), 626; viscosity, 60 centipoises; and index of refraction ($n_D^{25}$), 1.4433. This oil remained homogeneous when cooled to 5° C. To this oil was added cesium hydroxide (about 150 parts by weight per million parts of the oil). The flask was filled with a reflux condenser and the oil was heated at 188° C. to complete the reaction. There was produced an oil that had the following physical properties: viscosity, 80 centipoises; index of refraction ($n_D^{25}$), 1.4446. This oil was composed of groups represented by the formulae:

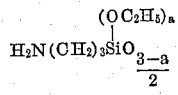

and

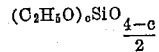

wherein *a* has a value from 0 to 2 and *c* has a value from 1 to 3.

*Example II*

A solution was formed in a 100-cc. flask. The solution contained 3.48 g. (0.167 mole) of tetraethyl orthosilicate and 65.6 g. of delta-aminobutylmethylsiloxane cyclic tetramer. The unreacted solution was clear and had the following physical properties: viscosity, 80 centipoises; molecular weight (cryoscopic), 586; index of refraction ($n_D^{25}$) 1.4640. The solution was heated on an oil bath at 155° C. and a potassium dimethylsilanolate (containing 80 parts by weight of potassium per million parts by weight of the solution) was added as a catalyst. The heating at 155° C. was continued for 16 hours. There was so produced a clear, colorless oil that had the following physical properties: viscosity, 190 centipoises; molecular weight, 1222; and index of refraction ($n_D^{25}$), 1.4690. The oil was composed of groups having the formulae: [H$_2$N(CH$_2$)$_4$Si(OC$_2$H$_5$)(Me)O$_{0.5}$]

[H$_2$N(CH$_2$)$_4$Si(Me)O]

and

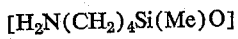

where *c* has a value from 1 to 3.

*Example III*

Gamma-aminopropyltriethoxysilane (133 g., 0.6 mole) was added to a 500-ml., three-necked, round-bottomed flask that was equipped with a stirrer, an addition funnel, and a distilling head. Water (10.8 g., 0.6 mole) was added to the flask dropwise while the contents of the flask were well stirred. The contents became cloudy during the addition of the water which required 15 minutes. Then the contents were heated slowly until refluxing occurred at a flask temperature of 143° C. and a head temperature of 78° C. A distillate (35 g.) was collected over a period of 1.5 hours during which time the flask temperature rose to 150° C. There was so obtained a hydroxy-containing siloxane composed mostly of groups having the formula:

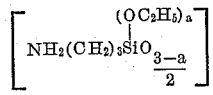

wherein *a* has a value from 0 to 2. The flask was allowed to cool to 105° C., and tetraethyl orthosilicate (62.5 g., 0.3 mole) was added dropwise with good stirring. The mixture became cloudy during the addition, and the mixture was heated until refluxing began at about a 178° C. flask temperature and a 78° C. head temperature. Volatile materials (20 g.) were collected during a period of two hours while the flask temperature rose to 210° C. When the contents of the flask were cooled to room temperature, two phases formed indicating that the reaction had been incomplete. Then 0.75 g. of a potassium dimethylsilanolate catalyst containing 2.1 parts by weight of potassium per 100 parts by weight of the silanolate (40 parts by weight of potassium per million parts by weight of the reactants) was added to the flask. A 10-inch Vigreux column was attached to the flask as an air condenser, an argon atmosphere was maintained in the flask, and the contents were heated at 150° C. for 3.5 hours. Then, the flask was cooled to room temperature. The product so produced was 142.0 g. of homogeneous fluid that had the following physical properties: index of refraction ($n_D^{25}$), 1.4283; viscosity at 20° C., 13.85 centipoises; and density ($d_4^{20}$), 1.032 g./ml. The product had the formula:

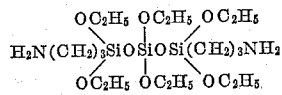

This product was found to contain 5.58 wt.-percent nitrogen (theoretical: 5.57 wt.-percent) and to have a molecular weight of 480±48 (theoretical 502).

*Example IV*

Gamma-aminopropyltriethoxysilane (88.4 g., 0.4 mole) was added to a one-liter, round-bottomed flask that was equipped with a stirrer and a distilling head. While the contents of the flask were stirred, water (7.2 g., 0.4 mole) was added dropwise over a period of 15 minutes. During the addition, the flask was heated to 145° C. and refluxing began (head temperature: 79° C.). The heating was continued for two hours during which time volatile materials (24.7 ml. of ethanol and water) were collected and the flask temperature rose to 160° C. The flask was allowed to cool to about 75° C. and then a polymeric alkylsilicate (148.8 g., 0.2 mole) having the formula: C$_2$H$_5$O[Si(OC$_2$H$_5$)$_2$O]$_5$C$_2$H$_5$ was added to the flask dropwise with stirring over a period of one hour. During this addition, an emulsion formed in the flask. The flask was heated until refluxing began (flask temperature 175° C. and head temperature 79° C.) and the refluxing was continued for two hours during which time 21.0 ml. of volatile materials were collected. The flask was allowed to cool to 160° C. and two phases formed indicating that the reaction had been incomplete. Then, a potassium dimethylsilanolate containing 2.5 parts by weight of potassium per 100 parts by weight of the silanolate (40 parts by weight of potassium per million parts by weight of the contents of the flask) was added to the flask. The contents of the flask were heated at 160° C. with stirring for four hours. A homogeneous fluid (205.5 g.) was produced that remained homogeneous when cooled to room temperature. The fluid had the following physical properties: index of refraction ($n_D^{25}$), 1.4165; viscosity at 20° C., 26.2 centipoises; and density ($d_4^{20}$), 1.076 g./ml. The fluid was a copolymer that had the formula:

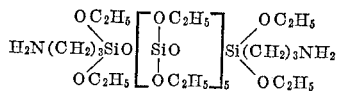

In this example and in the following example the starting siloxane was an in situ formed ethoxy containing gamma-aminopropylpolysiloxane formed by the hydrolysis and condensation of gamma-aminopropyltriethoxysilane.

*Example V*

Gamma-aminopropyltriethoxysilane (66.2 g., 0.3 mole) was added to a one-liter, three-necked flask that was equipped with a stirrer and a distilling head. Water (5.4 g., 0.3 mole) was added dropwise to the flask with stirring. The flask was heated to reflux (flask temperature 140° C. and distilling head temperature 79° C.) and volatile materials were collected (13.8 g., $n_D^{25}=1.3608$). The flask was cooled to 100° C. and a polymeric alkylsilicate (224 g., 0.3 mole) that had the formula $$C_2H_5O[Si(OC_2H_5)_2O]_5C_2H_5$$

was added slowly to the flask over a period of 30 minutes. The mixture in the flask became cloudy during the addition. The flask was heated until the contents refluxed (flask temperature 175° C. and distilling head temperature 83° C.). An atmosphere of nitrogen was maintained in the flask and a potassium dimethylsilanolate catalyst containing 2.5 parts by weight of potassium per 100 parts by weight of the silanolate (40 parts by weight of potassium per million parts by weight of the contents of the flask) were added to the flask. The flask was heated at about 175° C. for 0.5 hour and 13.8 g. of volatile materials ($n_D^{25}=1.3622$) were collected. Continued heating with stirring at 180° C. for about 3.0 hours resulted in the production of a clear colorless oil (259 g.). The oil had a refractive index ($n_D^{25}$) of 1.4087 and a density ($d_4^{20}$) of 1.072 g./ml. The oil was a copolymer that had the formula:

The copolymer was found to contain 1.56 parts by weight of nitrogen (theoretically 1.57 parts) per 100 parts by weight of the copolymer.

*Example VI*

Two painted steel cabinets were uniformly painted with bis(gamma-aminopropyl)hexaethoxytrisiloxane,

(10 wt.-percent trisiloxane in toluene), and for comparison, another silicone polish was applied. This latter mentioned polish contained 1.5 parts by weight of a dimethylpolysiloxane oil that had a viscosity of 350 centistokes, 2.5 parts by weight of wax and 95 parts by weight of naphthol mineral spirits per 100 parts by weight of the polish. The copolymer of this invention produced a uniform hard, very glossy film which air dried in approximately 5 minutes to give a protective coating about 5 mils thick. No polishing after drying was necessary. The gloss from this film was superior to that obtained with the polish. The reference polish is typical of commercially available silicone polishes.

What is claimed is:
1. A copolymer comprising (1) at least one group that is represented by the formula:

wherein Z is a member selected from the group consisting of the hydrogen atom, the monovalent hydrocarbon groups and the amino-substituted monovalent hydrocarbon groups; R is a divalent hydrocarbon group containing at least three carbon atoms; the $Z_2N-$ group is attached to at least the third carbon removed from the silicon atom; R′ is an alkyl group; $R^2$ is a monovalent hydrocarbon group; $a$ has a value from 0 to 2; $b$ has a value from 0 to 2; and $(a+b)$ has a value from 0 to 2; and (2) at least one group represented by the formula:

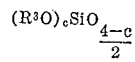

wherein $R^3$ is an alkyl group and $c$ has a value from 1 to 3.

2. A copolymer comprising (1) at least one group represented by the formula:

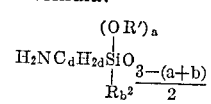

wherein R′ is an alkyl group, $R^2$ is a monovalent hydrocarbon group, $a$ has a value from 0 to 2, $b$ has a value from 0 to 2, $(a+b)$ has a value from 0 to 2, $d$ has a value of at least 3 and the $H_2N-$ group is attached to at least the third carbon removed from the silicon atom; and (2) at least one group represented by the formula:

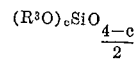

wherein $R^3$ is an alkyl group containing from 1 to 4 carbon atoms and $c$ has a value from 1 to 3.

3. A copolymer comprising (1) at least one group represented by the formula:

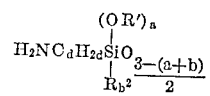

wherein R′ is an alkyl group, $R^2$ is a monovalent hydrocarbon group, $a$ has a value from 0 to 2, $b$ has a value from 0 to 2, $(a+b)$ has a value from 0 to 2, $d$ has a value of at least 3 and the $H_2N-$ group is attached to at least the third carbon removed from the silicon atom; (2) at least one group represented by the formula:

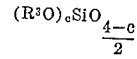

wherein $R^3$ is an alkyl group containing from 1 to 4 carbon atoms and $c$ has a value from 1 to 3; and (3) at least one group represented by the formula:

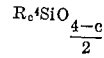

wherein $R^4$ is a monovalent hydrocarbon group and $c$ has a value from 1 to 3.

4. A copolymer comprising groups having the formulae:

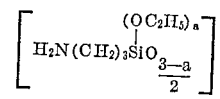

and

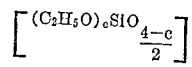

wherein $a$ has a value from 0 to 2 and $c$ has a value from 1 to 3.

5. A copolymer having the formula:

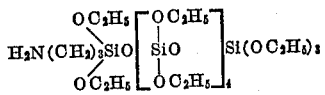

6. A copolymer having the formula:

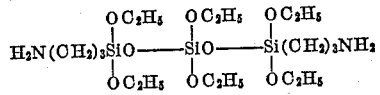

7. A copolymer having the formula:

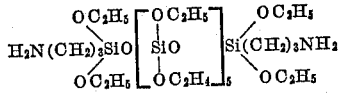

8. A copolymer composed of the groups having the formulae:

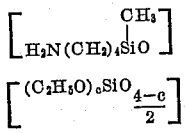

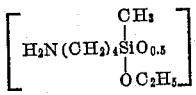

and

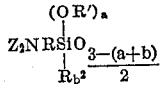

wherein $c$ has a value from 1 to 3.

9. A process for producing a copolymer comprising (1) at least one group that is represented by the formula:

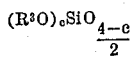

wherein Z is a member selected from the group consisting of the hydrogen atom, the monovalent hydrocarbon groups and the amino-substituted monovalent hydrocarbon groups; R is a divalent hydrocarbon group containing at least three carbon atoms; the $Z_2N-$ group is attached to at least the third carbon removed from the silicon atom; R' is an alkyl group; $R^2$ is a monovalent hydrocarbon group; $a$ has a value from 0 to 2; $b$ has a value from 0 to 2; and $(a+b)$ has a value from 0 to 2; and (2) at least one group represented by the formula:

$$(R^3O)_cSiO_{\frac{4-c}{2}}$$

wherein $R^3$ is an alkyl group and $c$ has a value from 1 to 3, said process comprising forming a mixture of (a) a siloxane containing at least one group represented by the formula:

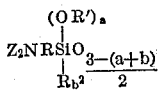

wherein Z, R, R', $R^2$, $a$ and $b$ have the above defined meanings and (b) an alkylsilicate and heating the mixture to a temperature from 80° C. to 250° C. to cause the siloxane and the silicate to react to produce a copolymer.

10. A process for producing a copolymer comprising (1) at least one group represented by the formula:

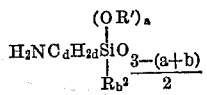

wherein R' is an alkyl group, $R^2$ is a monovalent hydrocarbon group, $a$ has a value from 0 to 2, $b$ has a value from 0 to 2, $(a+b)$ has a value from 0 to 2, $d$ has a value of at least 3 and the $H_2N-$ group is attached to at least the third carbon removed from the silicon atom; and (2) at least one group represented by the formula:

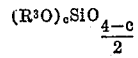

wherein $R^3$ is an alkyl group containing from 1 to 4 carbon atoms and $c$ has a value from 1 to 3, said process comprising forming a mixture of (a) a siloxane containing at least one group represented by the formula:

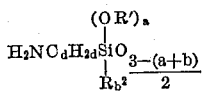

wherein R', $R^2$, $a$, $b$ and $d$ have the above-defined meanings, (b) an alkyl silicate wherein the alkyl groups contain from 1 to 4 carbon atoms, and (c) a basic catalyst and heating the mixture to a temperature from 80° C. to 170° C. to cause the siloxane and the silicate to react to produce the copolymer.

11. A copolymer consisting essentially of (1) from 5 parts to 75 parts by weight of groups represented by the formula:

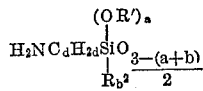

wherein R' is an alkyl group, $R^2$ is a monovalent hydrocarbon group containing from 1 to 10 carbon atoms, $a$ has a value from 0 to 2, $b$ has a value from 0 to 2, $(a+b)$ has a value from 0 to 2, $d$ has a value from 3 to 5 and the $H_2N-$ group is attached to at least the third carbon removed from the silicon atom; and (2) from 25 parts to 95 parts by weight of groups represented by the formula:

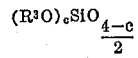

wherein $R^3$ is an alkyl group containing from 1 to 4 carbon atoms and $c$ has a value from 1 to 3, said parts by weight being based on 100 parts by weight of the copolymer.

References Cited in the file of this patent

UNITED STATES PATENTS

| | | |
|---|---|---|
| 2,738,357 | Speier | Mar. 13, 1956 |
| 2,881,184 | Pike | Apr. 7, 1959 |